(12) United States Patent
Harrison

(10) Patent No.: US 11,175,698 B2
(45) Date of Patent: Nov. 16, 2021

(54) METHODS AND SYSTEMS FOR PROCESSING TOUCH INPUTS BASED ON TOUCH TYPE AND TOUCH INTENSITY

(71) Applicant: Qeexo Co., San Jose, CA (US)

(72) Inventor: Christopher Harrison, Pittsburgh, PA (US)

(73) Assignee: QEEXO, CO., Mountain View, CA (US)

( * ) Notice: Subject to any disclaimer, the term of this patent is extended or adjusted under 35 U.S.C. 154(b) by 0 days.

(21) Appl. No.: 14/219,919

(22) Filed: Mar. 19, 2014

(65) Prior Publication Data
US 2016/0085333 A1  Mar. 24, 2016

(30) Foreign Application Priority Data

Mar. 19, 2013 (KR) .................. 10-2013-0029256
Mar. 10, 2014 (KR) .................. 10-2014-0027979

(51) Int. Cl.
*G06F 1/16* (2006.01)
*G06F 3/0487* (2013.01)

(52) U.S. Cl.
CPC .......... *G06F 1/1633* (2013.01); *G06F 3/0487* (2013.01); *G06F 2200/1636* (2013.01)

(58) Field of Classification Search
None
See application file for complete search history.

(56) References Cited

U.S. PATENT DOCUMENTS 2,008,028 A  7/1935 Mccortney et al.
2,430,005 A  11/1947 Denneen et al.
(Continued)

FOREIGN PATENT DOCUMENTS

CN  1161455  10/1997
CN  1797305 A  7/2006
(Continued)

OTHER PUBLICATIONS

Final Office Action received for U.S. Appl. No. 14/684,407 dated Jan. 18, 2017, 20 pages.
(Continued)

*Primary Examiner* — Matthew Yeung
(74) *Attorney, Agent, or Firm* — Kwan & Olynick LLP

(57) ABSTRACT

A method for sensing touch inputs to a digital equipment is provided, comprising the steps of sensing a sound/vibration signal generated by a touch, digitally processing the sensed sound/vibration signal, and determining the type of touch means that has generated the touch and the intensity of the touch based on the properties of the processed sound/vibration signal, wherein the properties include at least one of the following properties of the sound/vibration signal in time domain: maximum amplitude, average amplitude, average frequency, mean, standard deviation, standard deviation normalized by overall amplitude, variance, skewness, kurtosis, sum, absolute sum, root mean square (RMS), crest factor, dispersion, entropy, power sum, center of mass, coefficients of variation, cross correlation, zero-crossings, seasonality, DC bias, or the above properties computed for the first, second, third or higher order of derivatives of the sound/vibration signal; and the following properties of the sound/vibration signal in frequency domain: spectral centroid, spectral density, spherical harmonics, total average spectral energy, band energy ratios for every octave, log spectral band ratios, linear prediction-based cepstral coefficients (LPCCs), perceptual linear prediction (PLP) cepstral coefficients, mel-frequency cepstral coefficients, frequency topology, or the above properties computed for the first, second, third or higher order of derivatives of a frequency domain representation of the sound/vibration signal. There is also provided a device for sensing touch inputs.

22 Claims, 3 Drawing Sheets

(a)   (b)   (c)

(56) References Cited

U.S. PATENT DOCUMENTS

| | | | |
|---|---|---|---|
| 3,118,435 A | 1/1964 | Almquist | |
| 3,354,531 A | 11/1967 | Pryor | |
| 4,561,105 A | 12/1985 | Crane et al. | |
| 4,597,932 A | 7/1986 | Kurihara et al. | |
| 4,686,332 A | 8/1987 | Greanias et al. | |
| 5,483,261 A | 1/1996 | Yasutake | |
| 5,544,265 A | 8/1996 | Bozinovic et al. | |
| 5,596,656 A | 1/1997 | Goldberg | |
| 5,615,285 A | 3/1997 | Beemink | |
| 5,625,818 A | 4/1997 | Zarmer et al. | |
| 5,666,438 A | 9/1997 | Beemink et al. | |
| 5,867,163 A | 2/1999 | Kurtenbach | |
| 5,933,514 A | 8/1999 | Ostrem et al. | |
| 6,028,593 A | 2/2000 | Rosenberg et al. | |
| 6,118,435 A | 9/2000 | Fujita et al. | |
| 6,208,330 B1 | 3/2001 | Hasegawa et al. | |
| 6,212,295 B1 | 4/2001 | Ostrem et al. | |
| 6,222,465 B1 | 4/2001 | Kumar et al. | |
| 6,246,395 B1 | 6/2001 | Goyins et al. | |
| 6,252,563 B1 | 6/2001 | Tada et al. | |
| 6,323,846 B1 | 11/2001 | Westerman et al. | |
| 6,337,698 B1 | 1/2002 | Kelly, Jr. et al. | |
| 6,492,979 B1 | 12/2002 | Kent et al. | |
| 6,504,530 B1 | 1/2003 | Wilson et al. | |
| 6,643,663 B1 | 11/2003 | Dabney et al. | |
| 6,707,451 B1 | 3/2004 | Nagaoka | |
| 6,748,425 B1 | 6/2004 | Duffy et al. | |
| 6,772,396 B1 | 8/2004 | Cronin et al. | |
| 6,933,930 B2 | 8/2005 | Devige et al. | |
| 6,943,665 B2 | 9/2005 | Chornenky | |
| 7,050,955 B1 | 5/2006 | Carmel et al. | |
| 7,084,884 B1 | 8/2006 | Nelson et al. | |
| 7,098,896 B2 | 8/2006 | Kushler et al. | |
| 7,212,197 B1 | 5/2007 | Schkolne et al. | |
| 7,443,396 B2 | 10/2008 | Ilic | |
| 7,581,194 B2 | 8/2009 | Iwema et al. | |
| 7,982,724 B2 | 7/2011 | Hill | |
| 8,086,971 B2 | 12/2011 | Radivojevic et al. | |
| 8,144,126 B2 | 3/2012 | Wright | |
| 8,154,524 B2 | 4/2012 | Wilson et al. | |
| 8,154,529 B2 | 4/2012 | Sleeman et al. | |
| 8,170,346 B2 | 5/2012 | Ludwig | |
| 8,199,126 B1 | 6/2012 | Taubman | |
| 8,253,744 B2 | 8/2012 | Macura et al. | |
| 8,269,744 B2 | 9/2012 | Agar et al. | |
| 8,327,029 B1 | 12/2012 | Purser | |
| 8,430,310 B1 | 4/2013 | Ho et al. | |
| 8,441,790 B2 | 5/2013 | Pance et al. | |
| 8,547,357 B2 | 10/2013 | Aoyagi | |
| 8,624,878 B2 | 1/2014 | Sarwar et al. | |
| 8,670,632 B2 | 3/2014 | Wilson | |
| 8,674,943 B2 | 3/2014 | Westerman et al. | |
| 8,743,091 B2 | 6/2014 | Bernstein | |
| 8,760,395 B2 | 6/2014 | Kim et al. | |
| 8,762,332 B2 | 6/2014 | Keebler et al. | |
| 8,769,524 B2 | 7/2014 | Bhullar et al. | |
| 9,013,452 B2 | 4/2015 | Harrison et al. | |
| 9,019,244 B2 | 4/2015 | Harrison | |
| 9,030,498 B2 | 5/2015 | Galor et al. | |
| 9,052,772 B2 | 6/2015 | West | |
| 9,060,007 B2 | 6/2015 | Keebler et al. | |
| 9,182,882 B2 | 11/2015 | Fowler et al. | |
| 9,329,688 B2 | 5/2016 | Harrison | |
| 9,329,715 B2 | 5/2016 | Schwarz et al. | |
| 9,377,863 B2 | 6/2016 | Bychkov et al. | |
| 9,465,494 B2 | 10/2016 | Harrison | |
| 9,557,852 B2 | 1/2017 | Tsai et al. | |
| 9,612,689 B2 | 4/2017 | Harrison et al. | |
| 9,696,859 B1 | 7/2017 | Heller et al. | |
| 9,864,453 B2 | 1/2018 | Munemoto et al. | |
| 9,864,454 B2 | 1/2018 | Harrison et al. | |
| 10,082,935 B2 | 9/2018 | Harrison et al. | |
| 10,318,034 B1 | 6/2019 | Hauenstein | |
| 2002/0009227 A1 | 1/2002 | Goldberg et al. | |
| 2002/0057837 A1 | 5/2002 | Wilkinson et al. | |
| 2002/0070927 A1 | 6/2002 | Fujitsuka et al. | |
| 2002/0126161 A1 | 9/2002 | Kuzunuki et al. | |
| 2003/0048260 A1 | 3/2003 | Matusis | |
| 2003/0110085 A1 | 6/2003 | Murren et al. | |
| 2003/0132922 A1 | 7/2003 | Phillip | |
| 2003/0217873 A1 | 11/2003 | Paradiso et al. | |
| 2004/0012573 A1 | 1/2004 | Morrison et al. | |
| 2004/0021681 A1 | 2/2004 | Liao | |
| 2004/0054711 A1 | 3/2004 | Multer | |
| 2004/0141010 A1 | 7/2004 | Fitzmaurice et al. | |
| 2004/0160421 A1* | 8/2004 | Sullivan | G06F 3/0436 345/173 |
| 2004/0199867 A1 | 10/2004 | Brandenborg | |
| 2004/0225730 A1 | 11/2004 | Brown et al. | |
| 2005/0083313 A1 | 4/2005 | Hardie-Bick | |
| 2005/0131778 A1 | 6/2005 | Bennett et al. | |
| 2005/0146512 A1 | 7/2005 | Hill et al. | |
| 2005/0146513 A1* | 7/2005 | Hill | G06F 3/0436 345/173 |
| 2005/0289461 A1 | 12/2005 | Amado et al. | |
| 2006/0010400 A1 | 1/2006 | Dehlin et al. | |
| 2006/0026535 A1 | 2/2006 | Hotelling et al. | |
| 2006/0031746 A1 | 2/2006 | Toepfer et al. | |
| 2006/0132456 A1* | 6/2006 | Anson | G06F 3/0488 345/173 |
| 2006/0152499 A1 | 7/2006 | Roberts | |
| 2006/0173985 A1 | 8/2006 | Moore | |
| 2006/0184617 A1 | 8/2006 | Nicholas et al. | |
| 2006/0217126 A1 | 9/2006 | Sohm et al. | |
| 2006/0230021 A1 | 10/2006 | Diab et al. | |
| 2006/0288329 A1 | 12/2006 | Gandhi et al. | |
| 2007/0011205 A1 | 1/2007 | Majasie et al. | |
| 2007/0044010 A1 | 2/2007 | Sull et al. | |
| 2007/0075965 A1 | 4/2007 | Huppi et al. | |
| 2007/0085157 A1 | 4/2007 | Fadell et al. | |
| 2007/0100959 A1 | 5/2007 | Eichstaedt et al. | |
| 2007/0109279 A1 | 5/2007 | Sigona | |
| 2007/0126716 A1 | 6/2007 | Haverly | |
| 2007/0168367 A1 | 7/2007 | Dickinson et al. | |
| 2007/0186157 A1 | 8/2007 | Walker et al. | |
| 2007/0192674 A1 | 8/2007 | Bodin et al. | |
| 2007/0245020 A1 | 10/2007 | Ott, IV | |
| 2007/0257767 A1 | 11/2007 | Beeson | |
| 2007/0291297 A1 | 12/2007 | Harmon et al. | |
| 2008/0005666 A1 | 1/2008 | Sefton et al. | |
| 2008/0036743 A1 | 2/2008 | Westerman et al. | |
| 2008/0042978 A1 | 2/2008 | Perez-Noguera | |
| 2008/0082941 A1 | 4/2008 | Goldberg et al. | |
| 2008/0103906 A1 | 5/2008 | Singh | |
| 2008/0117168 A1 | 5/2008 | Liu et al. | |
| 2008/0126388 A1 | 5/2008 | Naaman | |
| 2008/0141132 A1 | 6/2008 | Tsai | |
| 2008/0155118 A1 | 6/2008 | Glaser et al. | |
| 2008/0158147 A1 | 7/2008 | Westerman et al. | |
| 2008/0158168 A1 | 7/2008 | Westerman et al. | |
| 2008/0158185 A1 | 7/2008 | Westerman | |
| 2008/0168403 A1 | 7/2008 | Westerman et al. | |
| 2008/0180406 A1 | 7/2008 | Han et al. | |
| 2008/0244468 A1 | 10/2008 | Nishihara et al. | |
| 2008/0288347 A1 | 11/2008 | Sifry | |
| 2008/0319932 A1 | 12/2008 | Yih et al. | |
| 2009/0025987 A1 | 1/2009 | Perksi et al. | |
| 2009/0073144 A1 | 3/2009 | Chen et al. | |
| 2009/0095540 A1 | 4/2009 | Zachut et al. | |
| 2009/0150373 A1 | 6/2009 | Davis et al. | |
| 2009/0157206 A1 | 6/2009 | Weinberg et al. | |
| 2009/0174679 A1 | 7/2009 | Westerman | |
| 2009/0178011 A1 | 7/2009 | Ording et al. | |
| 2009/0231275 A1 | 9/2009 | Odgers | |
| 2009/0232355 A1 | 9/2009 | Minear et al. | |
| 2009/0254869 A1 | 10/2009 | Ludwig et al. | |
| 2009/0259628 A1 | 10/2009 | Farrell et al. | |
| 2009/0262637 A1 | 10/2009 | Badaye et al. | |
| 2009/0315835 A1 | 12/2009 | Goes et al. | |
| 2009/0318192 A1 | 12/2009 | Leblanc et al. | |
| 2010/0036967 A1 | 2/2010 | Caine et al. | |
| 2010/0060602 A1 | 3/2010 | Agari et al. | |
| 2010/0085216 A1 | 4/2010 | Ms | |
| 2010/0094633 A1 | 4/2010 | Kawamura et al. | |

(56) References Cited

U.S. PATENT DOCUMENTS

| | | |
|---|---|---|
| 2010/0123666 A1 | 5/2010 | Wickholm et al. |
| 2010/0127997 A1 | 5/2010 | Park et al. |
| 2010/0194703 A1 | 8/2010 | Fedor et al. |
| 2010/0214267 A1 | 8/2010 | Radivojevic et al. |
| 2010/0225601 A1 | 9/2010 | Homma et al. |
| 2010/0251112 A1 | 9/2010 | Hinckley et al. |
| 2010/0265185 A1 | 10/2010 | Oksanen |
| 2010/0271322 A1 | 10/2010 | Kondoh et al. |
| 2010/0274622 A1 | 10/2010 | Kennedy et al. |
| 2010/0279738 A1 | 11/2010 | Kim et al. |
| 2010/0289754 A1 | 11/2010 | Sleeman et al. |
| 2010/0302184 A1 | 12/2010 | East et al. |
| 2010/0306649 A1 | 12/2010 | Russ et al. |
| 2010/0309158 A1 | 12/2010 | Iwayama et al. |
| 2010/0309933 A1 | 12/2010 | Stark et al. |
| 2011/0003550 A1 | 1/2011 | Klinghult et al. |
| 2011/0007000 A1 | 1/2011 | Lim |
| 2011/0018825 A1* | 1/2011 | Kondo ................. G06F 3/0433 345/173 |
| 2011/0057670 A1 | 3/2011 | Jordan |
| 2011/0057885 A1 | 3/2011 | Lehtovirta |
| 2011/0074544 A1 | 3/2011 | D'Souza |
| 2011/0074701 A1* | 3/2011 | Dickinson ............... G06F 3/041 345/173 |
| 2011/0080349 A1 | 4/2011 | Holbein et al. |
| 2011/0133934 A1 | 6/2011 | Tan et al. |
| 2011/0134063 A1 | 6/2011 | Norieda |
| 2011/0134083 A1 | 6/2011 | Norieda |
| 2011/0141066 A1 | 6/2011 | Shimotani et al. |
| 2011/0145706 A1 | 6/2011 | Wilson et al. |
| 2011/0164029 A1 | 7/2011 | King et al. |
| 2011/0167391 A1 | 7/2011 | Momeyer et al. |
| 2011/0169763 A1 | 7/2011 | Westerman et al. |
| 2011/0169778 A1 | 7/2011 | Nungester et al. |
| 2011/0173235 A1 | 7/2011 | Aman et al. |
| 2011/0175813 A1 | 7/2011 | Sarwar et al. |
| 2011/0175821 A1 | 7/2011 | King |
| 2011/0187652 A1 | 8/2011 | Huibers |
| 2011/0202848 A1 | 8/2011 | Ismalon |
| 2011/0210943 A1 | 9/2011 | Zaliva |
| 2011/0231290 A1 | 9/2011 | Narcisse et al. |
| 2011/0238613 A1 | 9/2011 | Shehory et al. |
| 2011/0246463 A1 | 10/2011 | Carson, Jr. et al. |
| 2011/0246503 A1 | 10/2011 | Bender et al. |
| 2011/0248927 A1 | 10/2011 | Michaelis et al. |
| 2011/0248948 A1 | 10/2011 | Griffin et al. |
| 2011/0261083 A1 | 10/2011 | Wilson |
| 2011/0298798 A1 | 12/2011 | Krah |
| 2011/0310040 A1 | 12/2011 | Ben-Shalom et al. |
| 2012/0001875 A1 | 1/2012 | Li et al. |
| 2012/0007821 A1 | 1/2012 | Zaliva |
| 2012/0007836 A1 | 1/2012 | Wu et al. |
| 2012/0011106 A1 | 1/2012 | Reid et al. |
| 2012/0019562 A1 | 1/2012 | Park et al. |
| 2012/0051596 A1 | 3/2012 | Darnell et al. |
| 2012/0056846 A1 | 3/2012 | Zaliva |
| 2012/0078942 A1 | 3/2012 | Cai et al. |
| 2012/0096041 A1 | 4/2012 | Rao et al. |
| 2012/0113017 A1 | 5/2012 | Benko et al. |
| 2012/0120000 A1 | 5/2012 | Lucic et al. |
| 2012/0131139 A1 | 5/2012 | Siripurapu et al. |
| 2012/0146938 A1 | 6/2012 | Worfolk et al. |
| 2012/0150871 A1 | 6/2012 | Hua et al. |
| 2012/0158629 A1 | 6/2012 | Hinckley et al. |
| 2012/0200517 A1 | 8/2012 | Nikolovski |
| 2012/0206330 A1 | 8/2012 | Cao et al. |
| 2012/0262407 A1 | 10/2012 | Hinckley et al. |
| 2012/0274583 A1* | 11/2012 | Haggerty ............... G06F 3/0488 345/173 |
| 2012/0280827 A1 | 11/2012 | Kashiwagi et al. |
| 2012/0280927 A1 | 11/2012 | Ludwig |
| 2012/0287056 A1 | 11/2012 | Ibdah |
| 2012/0287076 A1 | 11/2012 | Dao et al. |
| 2012/0313969 A1 | 12/2012 | Szymczyk et al. |
| 2012/0324349 A1 | 12/2012 | Pop-Lazarov et al. |
| 2013/0009896 A1 | 1/2013 | Zaliva |
| 2013/0014248 A1 | 1/2013 | McLaughlin et al. |
| 2013/0027404 A1 | 1/2013 | Samoff |
| 2013/0038554 A1* | 2/2013 | West ..................... G06F 3/0416 345/173 |
| 2013/0091123 A1 | 4/2013 | Chen et al. |
| 2013/0100071 A1 | 4/2013 | Wright et al. |
| 2013/0141382 A1 | 6/2013 | Simmons |
| 2013/0176264 A1 | 7/2013 | Alameh et al. |
| 2013/0176270 A1 | 7/2013 | Cattivelli et al. |
| 2013/0179773 A1 | 7/2013 | Lee |
| 2013/0187883 A1 | 7/2013 | Lim |
| 2013/0215070 A1 | 8/2013 | Sasaki |
| 2013/0234982 A1 | 9/2013 | Kang |
| 2013/0246861 A1 | 9/2013 | Colley et al. |
| 2013/0257757 A1 | 10/2013 | Kim |
| 2013/0265269 A1 | 10/2013 | Sharma et al. |
| 2013/0285942 A1 | 10/2013 | Ko |
| 2013/0287273 A1 | 10/2013 | Huang |
| 2013/0307814 A1 | 11/2013 | Chang |
| 2013/0307828 A1 | 11/2013 | Miller et al. |
| 2013/0316813 A1 | 11/2013 | Derome et al. |
| 2013/0328813 A1 | 12/2013 | Kuo et al. |
| 2013/0335333 A1 | 12/2013 | Kukulski et al. |
| 2014/0007002 A1 | 1/2014 | Chang et al. |
| 2014/0009401 A1 | 1/2014 | Bajaj et al. |
| 2014/0022189 A1 | 1/2014 | Sheng et al. |
| 2014/0032880 A1 | 1/2014 | Ka |
| 2014/0037951 A1 | 2/2014 | Shigetomi et al. |
| 2014/0071095 A1* | 3/2014 | Godsill ................. G06F 3/0418 345/177 |
| 2014/0082545 A1 | 3/2014 | Zhai et al. |
| 2014/0104191 A1 | 4/2014 | Davidson et al. |
| 2014/0104192 A1 | 4/2014 | Davidson et al. |
| 2014/0104274 A1 | 4/2014 | Hilliges et al. |
| 2014/0109004 A1 | 4/2014 | Sadhvani et al. |
| 2014/0168116 A1 | 6/2014 | Sasselli et al. |
| 2014/0192023 A1 | 7/2014 | Hoffman |
| 2014/0208275 A1 | 7/2014 | Mongia et al. |
| 2014/0210788 A1 | 7/2014 | Harrsion et al. |
| 2014/0210791 A1 | 7/2014 | Hanauer et al. |
| 2014/0240271 A1 | 8/2014 | Land et al. |
| 2014/0240295 A1 | 8/2014 | Harrison |
| 2014/0253477 A1 | 9/2014 | Shim et al. |
| 2014/0267065 A1 | 9/2014 | Levesque |
| 2014/0267085 A1 | 9/2014 | Li et al. |
| 2014/0289659 A1 | 9/2014 | Harrison et al. |
| 2014/0300559 A1 | 10/2014 | Tanimoto et al. |
| 2014/0327626 A1 | 11/2014 | Harrison et al. |
| 2014/0331313 A1 | 11/2014 | Kim et al. |
| 2014/0368436 A1 | 12/2014 | Abzarian et al. |
| 2015/0002405 A1 | 1/2015 | Kuan et al. |
| 2015/0035759 A1 | 2/2015 | Harrison et al. |
| 2015/0077378 A1 | 3/2015 | Duffield |
| 2015/0145820 A1 | 5/2015 | Huang et al. |
| 2015/0242009 A1 | 8/2015 | Xiao et al. |
| 2015/0253858 A1 | 9/2015 | Koukoumidis et al. |
| 2015/0293592 A1 | 10/2015 | Cheong et al. |
| 2016/0012348 A1 | 1/2016 | Johnson et al. |
| 2016/0018942 A1 | 1/2016 | Kang et al. |
| 2016/0062545 A1 | 3/2016 | Lai |
| 2016/0077615 A1 | 3/2016 | Schwarz et al. |
| 2016/0077650 A1 | 3/2016 | Durojaiye et al. |
| 2016/0077664 A1 | 3/2016 | Harrison et al. |
| 2016/0085324 A1 | 3/2016 | Schwarz et al. |
| 2016/0085333 A1 | 3/2016 | Christopher |
| 2016/0085372 A1 | 3/2016 | Munemoto et al. |
| 2016/0098185 A1 | 4/2016 | Xiao et al. |
| 2016/0117015 A1 | 4/2016 | Veneri et al. |
| 2016/0156837 A1 | 6/2016 | Rodzevski et al. |
| 2016/0171192 A1 | 6/2016 | Holz et al. |
| 2016/0224145 A1 | 8/2016 | Harrison et al. |
| 2016/0231865 A1 | 8/2016 | Harrison et al. |
| 2016/0299615 A1 | 10/2016 | Schwarz et al. |
| 2017/0024892 A1 | 1/2017 | Harrison et al. |
| 2017/0060279 A1 | 3/2017 | Harrison |
| 2017/0153705 A1 | 6/2017 | Kim et al. |

(56) References Cited

U.S. PATENT DOCUMENTS

FOREIGN PATENT DOCUMENTS

| | | |
|---|---|---|
| CN | 1928781 A | 3/2007 |
| CN | 101111817 A | 1/2008 |
| CN | 101299174 A | 11/2008 |
| CN | 101339477 A | 1/2009 |
| CN | 101410781 A | 4/2009 |
| CN | 101424974 A | 5/2009 |
| CN | 101438218 A | 5/2009 |
| CN | 101763190 A | 6/2010 |
| CN | 101763193 A | 6/2010 |
| CN | 101921610 A | 12/2010 |
| CN | 101968696 A | 2/2011 |
| CN | 102004925 | 4/2011 |
| CN | 102153776 A | 8/2011 |
| CN | 102362249 A | 2/2012 |
| CN | 102789332 A | 11/2012 |
| CN | 103150019 A | 6/2013 |
| CN | 104020878 A | 9/2014 |
| CN | 104160364 | 11/2014 |
| EP | 0 938 039 A2 | 8/1999 |
| EP | 1 659 481 A2 | 5/2006 |
| EP | 1 762 926 A2 | 3/2007 |
| EP | 2 136 358 A1 | 12/2009 |
| EP | 2 280 337 A2 | 2/2011 |
| GB | 2 344 894 A | 6/2000 |
| GB | 2 468 742 A | 9/2010 |
| JP | H09-69137 A | 3/1997 |
| JP | 2004-213312 A | 7/2004 |
| JP | 2005-018611 A | 1/2005 |
| JP | 2007-524970 A | 8/2007 |
| JP | 2009-543246 A | 12/2009 |
| JP | 2011-028555 A | 2/2011 |
| JP | 2013-519132 A | 5/2013 |
| JP | 2013-532495 A | 8/2013 |
| KR | 10-2002-0075283 A | 10/2002 |
| KR | 10-2011-0061227 A | 6/2011 |
| KR | 10-2012-0100351 A | 9/2012 |
| WO | 94/004992 A1 | 3/1994 |
| WO | 2006/070044 A1 | 7/2006 |
| WO | 2006070044 A1 | 7/2006 |
| WO | 2008/126347 A1 | 10/2008 |
| WO | 2009/071919 A1 | 6/2009 |
| WO | 2011/096694 A2 | 8/2011 |
| WO | 2012/064034 A1 | 5/2012 |
| WO | 2012/166277 A1 | 12/2012 |
| WO | 2013/059488 A1 | 4/2013 |
| WO | 2013/061998 A1 | 5/2013 |
| WO | 2014/037951 A1 | 3/2014 |
| WO | 2014/182435 A1 | 11/2014 |

OTHER PUBLICATIONS

Non-Final Office Action received for U.S. Appl. No. 14/684,407 dated Aug. 2, 2017, 14 pages.
Final Office Action received for U.S. Appl. No. 14/684,407 dated Mar. 12, 2018, 14 pages.
Non-Final Office Action received for U.S. Appl. No. 14/612,089 dated May 31, 2017, 21 pages.
Final Office Action received for U.S. Appl. No. 15/073,407, dated Dec. 20, 2016, 49 pages.
Non-Final Office Action received for U.S. Appl. No. 13/958,427, dated Nov. 10, 2016, 22 pages.
Non-Final Office Action received for U.S. Appl. No. 14/191,329, dated Feb. 2, 2017, 20 pages.
Final Office Action received for U.S. Appl. No. 13/887,711, dated Jun. 8, 2017, 33 pages.
Non-Final Office Action received for U.S. Appl. No. 15/075,648, dated Apr. 21, 2017, 8 pages.
Non-Final Office Action received for U.S. Appl. No. 14/486,800, dated Dec. 1, 2016, 29 pages.
Final Office Action received for U.S. Appl. No. 14/492,604, dated Mar. 17, 2017, 37 pages.
Non-Final Office Action received for U.S. Appl. No. 14/495,041, dated Nov. 25, 2016, 35 pages.
Non-Final Office Action received for U.S. Appl. No. 14/503,894, dated May 16, 2017, 33 pages.
Final Office Action received for U.S. Appl. No. 14/684,407, dated Sep. 14, 2018, 24 pages.
Final Office Action received for U.S. Appl. No. 14/834,434, dated May 1, 2017, 18 pages.
Non-Final Office Action received for U.S. Appl. No. 14/751,589, dated Jun. 13, 2016, 20 pages.
International Search Report and Written Opinion for PCT/US2016/044552; dated Oct. 17, 2016, 14 pages.
International Search Report and Written Opinion for PCT/US2016/040194; dated Sep. 19, 2016, 7 pages.
International Search Report and Written Opinion for PCT/US2015/051582; dated Feb. 26, 2016, 12 pages.
International Search Report and Written Opinion for PCT/US2015/051106; dated Jan. 28, 2016, 9 pages.
International Search Report and Written Opinion for PCT/US2015/047616; dated Jul. 1, 2016, 7 pages.
European Patent Office Extended Search Report for EP 14 83 2247; dated Feb. 23, 2017, 11 pages.
European Patent Office Extended Search Report for EP 14 79 4212; dated Nov. 9, 2016, 8 pages.
Non-Final Office Action received for U.S. Appl. No. 13/958,427, dated Mar. 13, 2015, 50 pages.
Final Office Action received for U.S. Appl. No. 13/958,427, dated Jun. 19, 2015, 17 pages.
Non-Final Office Action received for U.S. Appl. No. 13/887,711, dated Apr. 6, 2015, 36 pages.
Final Office Action received for U.S. Appl. No. 14/191,329, dated Aug. 7, 2015, 29 pages.
Non-Final Office Action received for U.S. Appl. No. 14/492,604, dated Oct. 1, 2015, 16 pages.
International Search Report and Written Opinion received for PCT Application No. PCT/US2014/049485 dated Nov. 17, 2014, 9 pages.
International Search Report and Written Opinion received for PCT Application No. PCT/US2014/033380 dated Mar. 13, 2015, 7 pages.
International Search Report and Written Opinion received for PCT Application No. PCT/US2014/034977 dated Sep. 18, 2014, 8 pages.
Non-Final Office Action received for U.S. Appl. No. 14/483,150 dated Dec. 18, 2015, 7 pages.
Non-Final Office Action—dated Oct. 2, 2015 U.S. Appl. No. 14/486,800, filed Sep. 15, 2014, 21 pages.
Non-Final Office Action received for U.S. Appl. No. 14/503,894, dated Dec. 30, 2015, 18 pages.
Non-Final Office Action received dated Nov. 5, 2015 U.S. Appl. No. 13/887,711, 19 pages.
Final Office Action dated Feb. 24, 2016 U.S. Appl. No. 13/887,711, 23 pages.
International Search Report and Written Opinion for PCT/US2015/051355; dated Dec. 15, 2015, 9 pages.
International Search Report and Written Opinion for PCT/US2015/047428; dated Nov. 27, 2015, 6 pages.
International Search Report and Written Opinion for PCT/US2015/050570; dated Dec. 17, 2015, 8 pages.
International Search Report and Written Opinion for PCT/US2015/014581; dated May 14, 2015, 7 pages.
Non-Final Office Action—dated Oct. 7, 2015 U.S. Appl. No. 14/495,041, 14 pages.
Non-Final Office Action dated Jun. 13, 2016 in U.S. Appl. No. 15/073,407, 49 pages.
Final Office Action dated Nov. 28, 2014 in U.S. Appl. No. 13/849,698, 21 pages.
Non-Final Office Action dated Jun. 24, 2014 in U.S. Appl. No. 13/849,698, 21 pages.
Non-Final Office Action dated Oct. 16, 2014 in U.S. Appl. No. 13/780,494, 10 pages.
U.S. Appl. No. 13/958,427, filed Aug. 2, 2013, titled: "Capture ofVibro-Acoustic Data Used to Determine Touch Types."

(56) References Cited

OTHER PUBLICATIONS

U.S. Appl. No. 14/191,329, filed Feb. 26, 2014, titled: "Using Capacitive Images for Touch Type Classification."
U.S. Appl. No. 13/887,711, filed May 6, 2013, titled: "Using Finger Touch Types to Interact with Electronic Devices."
U.S. Appl. No. 14/492,604, filed Sep. 22, 2014, titled: "Method and Apparatus for Improving Accuracy of Touch Screen Event Analysis By Use of Edge Classification.", 35 pages.
U.S. Appl. No. 14/495,041, filed Sep. 24, 2014, titled: "Method for Improving Accuracy of Touch Screen Event Analysis By Use of Spatiotemporal Touch Patterns.", 34 pages.
U.S. Appl. No. 14/483,150, filed Sep. 11, 2014, titled: "Method and Apparatus for Differentiating Touch Screen Users Based on Touch Event Analysis.", 38 pages.
U.S. Appl. No. 14/242,127, filed Apr. 1, 2014, titled: Method and Apparatus for Classifying Dtouch Events On a Touch Sensitive Surface, 36 pages.
U.S. Appl. No. 13/849,698, filed Mar. 23, 2013, titled: "Method and System for Activating Different Interactive Functions Using Different Types of Finger Contacts.", 52 pages.
Final Office Action dated Jul. 12, 2017 in U.S. Appl. No. 14/495,041, 14 pages.
Final Office Action dated Jul. 18, 2017 in U.S. Appl. No. 14/191,329, 17 pages.
Final Office Action dated Jun. 8, 2016 in U.S. Appl. No. 14/495,041, 16 pages.
Final Office Action dated Jun. 30, 2017 in U.S. Appl. No. 13/958,427, 15 pages.
Final Office Action dated Mar. 28, 2016 in U.S. Appl. No. 13/958,427, 16 pages.
Final Office Action dated May 6, 2016 in U.S. Appl. No. 14/191,329, 17 pages.
Final Office Action dated May 13, 2016 in U.S. Appl. No. 14/390,831, 6 pages.
Final Office Action dated May 20, 2016 in U.S. Appl. No. 14/503,894, 17 pages.
Final Office Action dated Nov. 9, 2016 in U.S. Appl. No. 14/612,089, 11 pages.
Final Office Action dated Nov. 23, 2015 in U.S. Appl. No. 14/668,870, 14 pages.
Final Office Action dated Sep. 6, 2017 in U.S. Appl. No. 14/486,800, 17 pages.
International Search Report and Written Opinion dated Jul. 8, 2013 in International Application No. PCT/CA2013/000292, 9 pages.
International Search Report and Written Opinion dated Jun. 6, 2012 in International Patent Application No. PCT/CA2012/050127, 10 pages.
"Making it Easier to Share With Who You Want," Facebook, Aug. 23, 2011, last updated on Dec. 12, 2012 retrieved from https://www.facebook.com/notes/facebook/making-it-easier-to-share-with-who-you-want/10150251867797131/, retrieved on Jun. 1, 2018, 14 pages.
Cheng, B. et al., "SilentSense: Silent User Identification via Dynamics of Touch and Movement Behavioral Biometrics," Cryptography and Security (cs CR); Human-Computer Interaction, pp. 9, Aug. 31, 2013.
S. Furui, "Digital Speech Processing, synthesis, and recognition" Marcel Dekker, Inc. 2001. 40 pages.
English Translation of Chinese Office Action dated Nov. 3, 2017 in Chinese Application No. 201480002856.0, 12 pages.
English Translation of Final Rejection dated Apr. 27, 2015 in Korean Patent Application No. 10-2014-0027979, 3 pages.
English Translation of Final Rejection dated Dec. 12, 2014 in Korean Patent Application No. 10-2014-0027979, 3 pages.
English Translation of First Office Action dated Feb. 27, 2017 in Chinese Application No. 201480002879.1, 13 pages.
English Translation of First Office Action dated May 2, 2017 in Chinese Patent Application No. 201580000833.0, 9 pages.
English Translation of First Office Action dated Oct. 11, 2017 in Chinese Patent Application No. 20150209998.0, 10 pages.
English Translation of Notification of Reason For Refusal dated Jul. 10, 2014 in Korean patent application No. 10-2014-0027979, 3 pages.
Final Office Action dated Jan. 5, 2018 in U.S. Appl. No. 14/503,894, 16 pages.
English Translation of Second Office Action dated Jul. 6, 2017 in Chinese Application No. 201480002879.1, 14 pages.
English Translation of Third Office Action dated Oct. 16, 2017 in Chinese Application No. 201480002879.1, 4 pages.
Communication pursuant to Article 94(3) EPC dated Feb. 26, 2018 for European Patent Application No. 14785422.8, 7 pages.
Communication pursuant to Article 94(3) EPC dated Mar. 5, 2018 for European Patent Application No. 14794212.2, 5 pages.
Extended European Search Report dated Apr. 16, 2018 in European Application No. 15845310.0, 7 pages.
Extended European Search Report dated Aug. 11, 2016 in European Patent Application No. 14785422.8, 8 pages.
Extended European Search Report dated Aug. 25, 2017 in European Patent Application No. 157 48667.1, 10 pages.
Extended European Search Report dated Jul. 22, 2014 in European Patent Application No. 12755563.9, 5 pages.
Extended European Search Report dated Mar. 16, 2018 in European Patent Application No. 15842839.1, 7 pages.
Extended European Search Report dated Mar. 19, 2018 in European Patent Application No. 15840819.5, 9 pages.
Extended European Search Report dated Mar. 19, 2018 in European Patent Application No. 15843933.1, 8 pages.
Extended European Search Report dated Mar. 27, 2018 in European Patent Application No. 15843989.3, 8 pages.
Extended European Search Report dated May 14, 2018 in European Patent Application No. 15847469.2, 11 pages.
Weidong, S et al., "SenGuard: Passive user identification on smartphones using multiple sensors," IEEE 7th International Conference on Wireless and Mobile Computing, Networking and Communications (WiMob), pp. 141-148, 2011.
Final Office Action dated Feb. 9, 2016 in U.S. Appl. No. 14/486,800, 14 pages.
Final Office Action dated Feb. 26, 2016 in U.S. Appl. No. 14/492,604, 16 pages.
Non-Final Office Action dated Sep. 9, 2016 in U.S. Appl. No. 13/887,711, 24 pages.
Non-Final Office Action dated Sep. 29, 2016 in U.S. Appl. No. 14/834,434, 12 pages.
Pedro, L et al., "Augmenting touch interaction through acoustic sensing", Proceedings of the ACM International Conference on Interactive Tabletops and Surfaces, pp. 53-56, Nov. 13-16, 2011.
Sarah, M. K. et al., "A Personal Touch-Recognizing Users Based on Touch Screen Behavior," PhoneSense'12, Nov. 6, 2012, Toronto, ON, Canada, Nov. 6, 2012, p. 5.
Schwarz, J et al., "Probabilistic Palm Rejection Using Spatiotemporal Touch Features and Iterative Classification," Proceedings of the SIGCHI Conference on Human Factors in Computing Systems, pp. 2009-2012, Apr. 26-May 1, 2014.
Search Report dated Apr. 21, 2017 in Chinese Patent Application No. 201580000833.0, 1 page.
"Swype Advanced Tips", [http://www.swype.com/tips/advanced-tips], Jun. 25, 2014, retrieved via the Wayback Machine on Jun. 29, 2018, [https:web.archive.org/web/20140625073212/http://www.swype.com/tips/advanced-tips], 2 pages.
"Swype Basics", [http://www.swype.com/tips/swype-basics], retrieved via the Wayback Machine dated Jun. 14, 2014, retrieved via the Wayback Machine on Jun. 29, 2018, [https:web.archive.org/web/20140614200707/http://www.swype.com/tips/swype-basics, 2 pages.
"Swype Tips", [http://www.swype.com/category/tips], Jul. 2, 2014, retrieved via the Wayback Machine on Jun. 29, 2018, [https:web.archive.org/web/20140702102357/http://www.swype.com/category/tips, 2 pages.
Kherallah, Metal., "On-line handwritten digit recognition based on trajectory and velocity modeling," Pattern Recognition Letters, vol. 29, Issue 5, pp. 580-594, Apr. 1, 2008.
Non-Final Office Action dated Apr. 15, 2015 in U.S. Appl. No. 13/856,414, 17 pages.

(56) References Cited

OTHER PUBLICATIONS

Non-Final Office Action dated Apr. 16, 2018 in U.S. Appl. No. 13/958,427, 14 pages.
Non-Final Office Action dated Apr. 19, 2017 in U.S. Appl. No. 14/869,998, 7 pages.
Non-Final Office Action dated Apr. 26, 2018 in U.S. Appl. No. 14/495,041, 15 pages.
Non-Final Office Action dated Dec. 20, 2017 in U.S. Appl. No. 14/834,434, 12 pages.
Non-Final Office Action dated Jul. 8, 2015 in U.S. Appl. No. 14/191,329, 18 pages.
Non-Final Office Action dated Jul. 11, 2017 in U.S. Appl. No. 14/390,831, 79 pages.
Non-Final Office Action dated Jul. 17, 2017 in U.S. Appl. No. 15/073,407, 8 pages.
Non-Final Office Action dated Jun. 9, 2016 in U.S. Appl. No. 14/612,089, 11 pages.
Non-Final Office Action dated May 7, 2018 in U.S. Appl. No. 14/191,329, 17 pages.
Non-Final Office Action dated May 9, 2018 in U.S. Appl. No. 13/887,711, 27 pages.
Non-Final Office Action dated Nov. 15, 2017 in U.S. Appl. No. 15/198,062, 24 pages.
Non-Final Office Action dated Nov. 24, 2015 in U.S. Appl. No. 14/191,329, 31 pages.
Non-Final Office Action dated Oct. 8, 2015 in U.S. Appl. No. 13/958,427, 15 pages.
Non-Final Office Action dated Oct. 18, 2017 in U.S. Appl. No. 15/406,770, 12 pages.
Non-Final Office Action dated Oct. 19, 2015 in U.S. Appl. No. 14/668,870, 6 pages.
Non-Final Office Action dated Oct. 23, 2014 in U.S. Appl. No. 14/275,124, 10 pages.
Non-Final Office Action dated Oct. 25, 2013 in U.S. Appl. No. 13/410,956, 8 pages.
Non-Final Office Action dated Oct. 28, 2015 in U.S. Appl. No. 14/390,831, 22 pages.
Non-Final Office Action dated Sep. 8, 2016 in U.S. Appl. No. 14/492,604, 14 pages.
Notice of Allowance dated Jan. 26, 2015 in U.S. Appl. No. 13/849,698, 27 pages.
Notice of Allowance dated Dec. 6, 2016 in U.S. Appl. No. 14/751,589, 27 pages.
Non-Final Office Action dated Jul. 30, 2018 in U.S. Appl. No. 15/406,770, 20 pages.
Notice of Allowance dated Feb. 2, 2015 in U.S. Appl. No. 13/780,494, 43 pages.
Non-Final Office Action dated Jun. 26, 2018 in U.S. Appl. No. 14/486,800, 25 pages.
Final Office Action dated Aug. 8, 2018 in U.S. Appl. No. 14/834,434, 19 pages.
Non-Final Office Action dated Sep. 2, 2014 in U.S. Appl. No. 13/863,193, 41 pages.
Final Office Action dated Mar. 4, 2015 in U.S. Appl. No. 13/863,193, 50 pages.
Non-Final Office Action dated Jan. 7, 2016 in U.S. Appl. No. 13/863,193, 58 pages.
Final Office Action dated Sep. 15, 2016 in U.S. Appl. No. 13/863,193, 50 pages.
Non-Final Office Action dated Apr. 6, 2017 in U.S. Appl. No. 13/863,193, 70 pages.
Final Office Action dated Jan. 9, 2018 in U.S. Appl. No. 13/863,193, 50 pages.
Notice of Allowance dated May 22, 2018 in U.S. Appl. No. 13/863,193, 73 pages.
Notice of Allowance dated Sep. 1, 2016 in U.S. Appl. No. 13/856,414, 28 pages.
Chinese Office Action for Chinese Patent Application No. 201510240522.3 dated Jun. 28, 2018, 30 pages (including English Translation.
Chinese Office Action for Chinese Patent Application No. 201280062500.7, dated Apr. 27, 2018, 19 pages (including English Translation.
Chinese Office Action for Chinese Patent Application No. 201280062500.7, dated Oct. 10, 2018, 14 pages.
Office Action dated Mar. 30, 2018 for U.S. Appl. No. 15/886,562, 44 pages.
Office Action dated Aug. 10, 2018 for U.S. Appl. No. 15/886,562, 86 pages.
Japanese Office Action dated Aug. 1, 2018 for Japanese Patent Application No. 2017-049566, 9 pages (including English translation).
Korean Office Action dated Jan. 10, 2019 for Korean Patent Application No. 2014-7010323, 11 pages (including English translation).
Office Action dated Jan. 28, 2019 for U.S. Appl. No. 15/836,798, 30 pages.
Final Office Action received for U.S. Appl. No. 15/075,648 dated Dec. 21, 2018, 13 pages.
Non-Final Office Action received for U.S. Appl. No. 15/815,679 dated Sep. 28, 2018, 69 pages.
Final Office Action received for U.S. Appl. No. 15/198,062 dated Sep. 6, 2018, 32 pages.
Chinese Office Action dated Apr. 21, 2017 for Chinese Patent Application No. 201480022056.5, 23 pages (with Translation).
Chinese Office Action dated Feb. 9, 2018 for Chinese Patent Application No. 201480022056.5, 19 pages (with Translation).
Non-Final Office Action received for U.S. Appl. No. 16/126,175 dated Nov. 1, 2018, 86 pages.
Third Chinese Office Action received for Chinese Patent Application No. 201480022056.5 dated Jul. 19, 2018, 6 pages (with English translation).
Communication pursuant to Article 94(3) EPC for European Patent Application No. 14785422.8 dated Nov. 22, 2018, 5 pages.
Communication pursuant to Article 94(3) EPC for European Patent Application No. 15845310.0 dated Jan. 3, 2019, 4 pages.
Communication pursuant to Article 94(3) EPC for European Patent Application No. 15840819.5 dated Jan. 23, 2019, 6 pages.
Communication pursuant to Article 94(3) EPC for European Patent Application No. 15842839.1 dated Apr. 9, 2019, 7 pages.
Chinese First Office Action received for Chinese Patent Application No. 201510240372.6 dated Sep. 27, 2018, 18 pages (including English Translation).
Chinese Second Office Action received for Chinese Patent Application No. 201510240372.6 dated May 15, 2019, 16 pages (including English Translation).
Communication pursuant to Article 94(3) EPC for European Patent Application No. 15843933.1 dated Jan. 23, 2019, 6 pages.
Chinese Search Report received for Chinese Patent Application No. 201580053216.7, dated Apr. 16, 2019, 2 pages.
European Search Report received for European Patent Application No. 16839786.7, dated Feb. 12, 2019, 8 pages.
Communication pursuant to Rules 70(2) and 70a(2) EPC received for European Patent Application No. 16839786.7 dated Mar. 1, 2019, 1 page.
Chinese Second Office Action received for Chinese Patent Application No. 201580000833.0 dated Jan. 15, 2018, 17 pages.
European Search Report received for European Patent Application No. 16818725.0, dated Dec. 21, 2018, 8 pages.
Communication pursuant to Rules 70(2) and 70a(2) EPC received for European Patent Application No. 16818725.0 dated Jan. 8, 2019, 1 page.
First Office Action received for Canadian Patent Application No. 2869699, dated Nov. 27, 2014, 3 pages.
Second Office Action received for Canadian Patent Application No. 2869699, dated Jun. 14, 2016, 4 pages.
Third Office Action received for Canadian Patent Application No. 2869699, dated Jan. 9, 2017, 3 pages.
First Examination report received for Australian Patent Application No. 2012225130, dated Feb. 9, 2015, 4 pages.
First Office Action received for Canadian Patent Application No. 2802746, dated Apr. 9, 2013, 3 pages.

(56) References Cited

OTHER PUBLICATIONS

Communication pursuant to Article 94(3) EPC received for European Patent Application No. 14832247.2 dated May 3, 2019, 7 pages.
Final Office Action received for U.S. Appl. No. 15/075,648 dated May 31, 2019, 17 pages.
European Search Report dated Apr. 8, 2019 for European Application No. 18195588.1, 7 pages.
Non-Final Office Action received for U.S. Appl. No. 15/836,798 dated Jul. 5, 2019, 95 pages.
Final Office Action received for U.S. Appl. No. 14/684,407 dated Jun. 10, 2019, 26 pages.
Non-Final Office Action received for U.S. Appl. No. 14/191,329 dated Jul. 16, 2019, 30 pages.
Chinese First Office Action received for Chinese Patent Application Serial No. 201580051873.8 dated Jun. 21, 2019, 15 pages (Including English Translation).
Final Office Action received for U.S. Appl. No. 13/887,711 dated Jul. 25, 2019, 24 pages.
Final Office Action received for U.S. Appl. No. 14/684,407 dated Sep. 20, 2019, 26 pages.
Final Office Action received for U.S. Appl. No. 14/495,041 dated Aug. 9, 2019, 26 pages.
Non-Final Office Action received for U.S. Appl. No. 14/834,434 dated Aug. 5, 2019, 19 pages.
Final Office Action received for U.S. Appl. No. 16/126,175 dated Aug. 2, 2019, 161 pages.
Non-Final Office Action received for U.S. Appl. No. 14/242,127 dated Jun. 2, 2015, 33 pages.
Final Office Action received for U.S. Appl. No. 14/242,127 dated Sep. 18, 2015, 28 pages.
Non-Final Office Action received for U.S. Appl. No. 14/242,127 dated Dec. 28, 2015, 38 pages.
Final Office Action received for U.S. Appl. No. 14/242,127 dated Mar. 31, 2016, 34 pages.
Notice of Allowance received for U.S. Appl. No. 14/242,127 dated Apr. 13, 2016, 18 pages.
Notice of Allowance received for U.S. Appl. No. 14/242,127 dated Sep. 2, 2016, 16 pages.
Asano et al., "Real-Time Sound Source Localization and Separation System and Its Application to Automatic Speech Recognition", Proceedings of Eurospeech, 2001; p. 1013-1016; 2001.
Benko et al., "Sphere: Multi-Touch Interactions on a Spherical Display", Proceedings of UIST, 2008; pp. 77-86.
Burges, Christopher J.C., "A Tutorial on Support Vector Machines for Pattern Recognition", Data Mining and Knowledge Discovery, Feb. 1998 pp. 121-167.
Cao et al., "ShapeTouch: Leveraging Contact Shape on Interactive Surfaces", IEEE International Workshop on Horizontal Interactive Human Computer System (TABLETOP), 2008, pp. 139-146.
Deyle et al., "Hambone: A Bio-Acoustic Gesture Interface", Proceedings of ISWC, 2007, pp. 1-8.
Dietz et al., DT Controls: Adding Identity to Physical Interfaces, ACM Symposium on User Interface Software & Technology (UIST), 2005, pp. 245-252.
Dietz et al., "DiamondTouch: A Multi-User Touch Technology" ACM Symposium on User Interface Software & Technology (UIST), 2001, pp. 219-226.
Gutwin et al., "Supporting Informal Collaboration in Shared-Workspace Groupware", Journal of Universal Computer Science, vol. 14, No. 9, 2008, pp. 1411-1434.
Hall et al., "The WEKA Data Mining Software: An Update", SIGKDD Explorations,vol. 11, No. 1, 2009, pp. 10-18.
Harrison et al., Skinput: Appropriating the Body as an Input Surface, Proceedings of CHI, Apr. 10-15, 2010, pp. 453-462.
Harrison et al., "Scratch Input: Creating Large, Inexpensive, Unpowered and Mobile Finger Input Surfaces", Proceedings of UIST, 2008, pp. 205-208.
Hartmann et al., "Augmenting Interactive Tables with Mice & Keyboards", Proceedings of UIST, 2009, pp. 149-152.

Hinckley et al., "Sensor Synaesthesia: Touch in Motion, and Motion in Touch", Proceedings of CHI, 2011, pp. 801-810.
Hinckley et al., "Pen+ Touch= New Tools", Proceedings of UIST, 2010, pp. 27-36.
Hinkley et al., "Manual Deskterity: An Exploration of Simultaneous Pen+ Touch Direct Input", Proceedings of CHI, 2010, pp. 2793-2802.
Holz et al., "The Generalized Perceived Input Point Model and How to Double Touch Accuracy by Extracting Fingerprints" Proceedings of CHI, 2010, pp. 581-590.
Kaltenbrunner., "reacTIVision: A Computer-Vision Framework for Table-Based Tangible Interaction", Proceedings ofTEI, 2007, pp. 69-74.
Matsushita et al., "HoloWall: Designing a Finger, Hand, Body, and Object Sensitive Wall", Proceedings of UIST, 1997, pp. 209-210.
"Mimio", http://www.mimio.com, Last accessed Sep. 24, 2019, 7 Pages.
Olwal et al., "SurfaceFusion: Unobtrusive Tracking of Everyday Objects in Tangible User Interfaces", Proceedings of GI, 2008, pp. 235-242.
Paradiso et al., "Tracking and Characterizing Knocks Atop Large Interactive Displays", Sensor Review, vol. 25, No. 2, 2005, pp. 134-143.
Paradiso et al., "Sensor Systems for Interactive Surfaces", IBM Systems Journal, vol. 39 No. 3&4, 2000, pp. 892-914.
Patten, James, Mcmichael., "Sensetable: A Wireless Object Tracking Platform for Tangible User Interfaces", Proceedings of CHI, 2001, pp. 253-260.
Rekimoto et al., "Augmented Surfaces: A Spatially Continuous Work Space for Hybrid Computing Environments", Proceedings of CHI, 1999, pp. 378-385.
Rekimoto et al., "ToolStone: Effective use of the Physical Manipulation Vocabularies of Input Devices", Proceedings of UIST, 2000, pp. 109-117.
Rekimoto et al., "SmartSkin: An Infrastructure for Freehand Manipulation on Interactive Surfaces", Proceedings of CHI, 2002, pp. 113-120.
Vandoren et al., "DIP-IT: Digital Infrared Painting on an Interactive Table", Proceedings of CHI, 2008, pp. 2901-2906.
Wang et al., "Empirical Evaluation for Finger Input Properties in Multi-Touch Interaction", Proceedings of CHI, 2009, pp. 1063-1072.
International Search Report and Written Opinion received for International Patent Application No. PCT/US2012/060865 dated Mar. 29, 2013, 10 pages.
Non-Final Office Action received for U.S. Appl. No. 15/206,554 dated Sep. 21, 2016, 36 pages.
Final Office Action issued for U.S. Appl. No. 15/206,554 dated Feb. 1, 2017, 20 pages.
Chinese Office Action for Chinese Patent Application No. 201280062500.7 dated Nov. 7, 2016, 9 pages.
Chinese Office Action for Chinese Patent Application No. 201280062500.7 dated Apr. 17, 2017, 15 pages (including English Translation).
Japanese Office Action for Japanese Patent Application No. 2014-537253 dated May 16, 2017, 5 pages (including English Translation).
Seo et al., "Audio Fingerprinting Based on Normalized Spectral Subband Centroids," Proc. ICASSP, {U.S.A.), 2005, vol. 3, p. 213-216. Retrieved on May 29, 2017, 4 pages.
Kunio, "Audio fingerprinting: Techniques and applications", Acoustical Science and Technology, The Acoustical Society of Japan, Feb. 1, 2010, vol. 66, No. 2, p. 71-76. Retrieved on May 29, 2017, 6 pages.
European Search Report dated Jul. 24, 2015 for European Application No. 12842495.9, 7 pages.
Chinese Search Report dated Mar. 29, 2016 for Chinese Application No. 201280062500.7, 1 page.
Chinese Office Action dated Apr. 15, 2016 for Chinese Application No. 201280062500.7, 11 pages.
Japanese Office Action for Japanese Patent Application No. 2014-537253 dated Nov. 15, 2016, 3 pages.

(56) References Cited

OTHER PUBLICATIONS

Japanese Office Action for Japanese Patent Application No. 2014-537253 dated Apr. 26, 2016, 3 pages.
Communication pursuant to Article 94(3) EPC for EP Application No. 12842495.9 dated Jun. 18, 2018, 4 pages.
Japanese Office Action for Japanese Patent Application No. 2017-049566 dated Jun. 5, 2018, 7 pages.
Non-Final Office Action received for U.S. Appl. No. 14/684,407 dated Jul. 8, 2016, 11 pages.
U.S. Appl. No. 15/815,679, Final Rejection, dated Jan. 16, 2020, 19 pgs.
U.S. Appl. No. 15/832,080, Non-Final Rejection, dated Mar. 9, 2020, 13 pgs.
U.S. Appl. No. 15/832,080, OA.APPENDIX—Office Action Appendix, dated Mar. 9, 2020, 1 pg.
U.S. Appl. No. 14/219,919, Non-Final Rejection, dated Dec. 11, 2019, 25 pgs.
Corrected Notice of Allowability dated Jan. 11, 2021 for U.S. Appl. No. 16/404,694 (pp. 1-2).
Corrected Notice of Allowability dated Jan. 25, 2021 for U.S. Appl. No. 16/404,694 (pp. 1-5).
English Translation of Decision of Refusal dated Nov. 10, 2016 in Japanese Patent Application No. 2014-537253. 3 pages.
English Translation of First Office Action dated Apr. 15, 2016 in Chinese Patent Application No. 201280062500.7. 11 pages.
English Translation of Notification of Reasons for Refusal dated Apr. 15, 2016 in Japanese Patent Application No. 2014-537253. 3 pages.
English Translation of Office Action dated May 9, 2017 in Japanese Patent Application No. 2014-537253. 5 pages.
English Translation of Second Office Action dated Nov. 7, 2016 in Chinese Patent Application No. 201280062500.7. 9 pages.
Final Office Action dated Mar. 7, 2018 in U.S. Appl. No. 14/219,919, 21 pages.
Final Office Action received for U.S. Appl. No. 14/219,919, dated Aug. 26, 2016, 24 pages.
Non-Final Office Action dated Jul. 19, 2017 in U.S. Appl. No. 14/219,919, 20 pages.
Non-Final Office Action—dated Jan. 29, 2016 U.S. Appl. No. 14/219,919, 11 pages.
Notice of Allowance dated Feb. 4, 2021 for U.S. Appl. No. 15/406,770 (pp. 1-8).
Notice of Allowance issued in U.S. Appl. No. 16/404,694, dated Dec. 3, 2020, 8 pages.
Stevan Vigneaux, Director of Product Management, Mimio, "Choosing and Installing a Whiteboard for a Touch Projector", www.mimio.boxlight.com, Jan. 15, 2020. 10 pages.
U.S. Appl. No. 13/780,494, filed Feb. 28, 2013, titled: "Input Tools Having Viobro-Acoustically Distinct Regions and Computing Device for Use With the Same." 34 pages.
U.S. Appl. No. 14/483,150, filed Sep. 11, 2014, titled: "Method and Apparatus for Differentiating Touch Screen Users Based on Touch Event Analysis."
U.S. Appl. No. 14/492,604, filed Sep. 22, 2014, titled: "Method and Apparatus for Improving Accuracy of Touch Screen Event Analysis by Use of Edge Classification."
U.S. Appl. No. 14/495,041, filed Sep. 24, 2014, titled: "Method for Improving Accuracy of Touch Screen Event Analysis by Use of Spatiotemporal Touch Patterns."
International Search Report and Written Opinion for App. No. PCT/US2020/040911, dated Oct. 6, 2020, 8 pages.
Notice of Allowance dated May 13, 2021 for U.S. Appl. No. 15/832,080 (pp. 1-10).

* cited by examiner (a)           (b)           (c)

(a)           (b)           (c)

METHODS AND SYSTEMS FOR PROCESSING TOUCH INPUTS BASED ON TOUCH TYPE AND TOUCH INTENSITY

FIELD OF THE INVENTION

The present invention relates to a method and device for sensing touch inputs.

BACKGROUND

As the technologies related to user interfaces used in mobile devices such as smartphones and tablets become diverse, and the performance of such mobile devices grows more powerful, users have come to desire that they use more convenient and natural user interfaces to provide their inputs to mobile devices. Therefore, the techniques for sensing a user's touch inputs on a touch panel have become more widely utilized instead of those related to existing keyboards or keypads.

The techniques to sense the above-mentioned touch inputs (mainly the physical touches) employ a variety of technologies such as resistive membrane mechanism, capacitive mechanism, infrared mechanism, ultrasonic mechanism and so on. Among the recent touch input sensing techniques, those related to the electronic devices having acoustic input devices presented in U.S. Pat. No. 8,441,790 assigned to Apple Inc. (the disclosure of which is incorporated herein by reference in its entirety) are notable.

Although the Apple's above techniques allow a user to provide his/her inputs to a mobile device by way of some principles distinguished from the above-mentioned conventional technologies, the techniques simply discriminate whether the user has performed a tap action or a dragging action on a specific part of the mobile device.

Meanwhile, one of other notable touch input sensing techniques is a method of sensing a type of action used to operate a touch panel, which is presented in U.S. Patent Application Publication No. 2011-18825 assigned to Sony Corporation (the disclosure of which is incorporated herein by reference in its entirety).

The Sony's technique uses a vibration sensor to sense that a part on or outside a touch panel of a device is touched by an object, and performs different operations according to the touches each caused by two different parts of one object. However, the above technique simply discriminates the touch means or the touched position of the device based on the volume, peak frequency or the like of the vibration generated by the touch, which may be sensed by the vibration sensor.

The inventor(s) has improved the above conventional techniques to minutely discriminate the types of touch inputs that users provide to mobile devices, so that various user touch inputs can be understood by user interfaces.

SUMMARY OF THE INVENTION

One object of the present invention is to solve all the above-described prior art problems.

Another object of the invention is to enable various user inputs to be understood by user interfaces.

Yet another object the invention is to minutely sense the sound or vibration generated by user touch inputs so that the types and intensities of such inputs are minutely discriminated.

Still another object of the invention is to discriminate touch means that a user has used to provide touch inputs based on the sound or vibration generated by the user's touch inputs.

According to one aspect of the invention to achieve the objects as described above, there is provided a method for sensing touch inputs to a digital equipment, comprising the steps of sensing a sound/vibration signal generated by a touch, digitally processing the sensed sound/vibration signal, and determining the type of touch means that has generated the touch and the intensity of the touch based on the properties of the processed sound/vibration signal, wherein the properties include at least one of the following properties of the sound/vibration signal in time domain: maximum amplitude, average amplitude, average frequency, mean, standard deviation, standard deviation normalized by overall amplitude, variance, skewness, kurtosis, sum, absolute sum, root mean square (RMS), crest factor, dispersion, entropy, power sum, center of mass, coefficients of variation, cross correlation, zero-crossings, seasonality, DC bias, or the above properties computed for the first, second, third or higher order of derivatives of the sound/vibration signal; and the following properties of the sound/vibration signal in frequency domain: spectral centroid, spectral density, spherical harmonics, total average spectral energy, band energy ratios for every octave, log spectral band ratios, linear prediction-based cepstral coefficients (LPCCs), perceptual linear prediction (PLP) cepstral coefficients, mel-frequency cepstral coefficients, frequency topology, or the above properties computed for the first, second, third or higher order of derivatives of a frequency domain representation of the sound/vibration signal.

According to another aspect of the invention, there is provided a touch input sensing device, comprising a signal sensing unit for sensing a sound/vibration signal generated by a touch, a signal processing unit for digitally processing the sensed sound/vibration signal, and a signal determination unit for determining the type of touch means that has generated the touch and the intensity of the touch based on the properties of the processed sound/vibration signal, wherein the properties include at least one of the following properties of the sound/vibration signal in time domain: maximum amplitude, average amplitude, average frequency, mean, standard deviation, standard deviation normalized by overall amplitude, variance, skewness, kurtosis, sum, absolute sum, root mean square (RMS), crest factor, dispersion, entropy, power sum, center of mass, coefficients of variation, cross correlation, zero-crossings, seasonality, DC bias, or the above properties computed for the first, second, third or higher order of derivatives of the sound/vibration signal; and the following properties of the sound/vibration signal in frequency domain: spectral centroid, spectral density, spherical harmonics, total average spectral energy, band energy ratios for every octave, log spectral band ratios, linear prediction-based cepstral coefficients (LPCCs), perceptual linear prediction (PLP) cepstral coefficients, mel-frequency cepstral coefficients, frequency topology, or the above properties computed for the first, second, third or higher order of derivatives of a frequency domain representation of the sound/vibration signal.

In addition, there may be provided other methods and devices to implement the invention.

According to the present invention, various user inputs can be understood by user interfaces.

According to the present invention, the sound or vibration generated by user touch inputs can be minutely sensed so that the types and intensities of such inputs are minutely discriminated.

According to the present invention, touch means that a user has used to provide touch inputs can be discriminated based on the sound or vibration generated by the user's touch inputs.

DETAILED DESCRIPTION OF THE PREFERRED EMBODIMENTS

Figure 1:
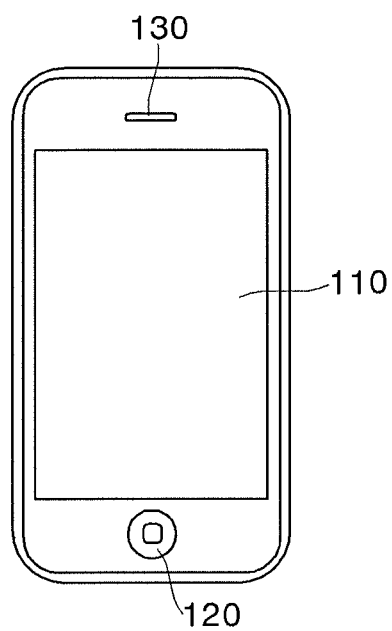
FIG. 1 shows an exterior view of a touch input sensing device according to one embodiment of the present invention.

In the following detailed description of the invention, references are made to the accompanying drawings that show, by way of illustration, specific embodiments in which the invention may be practiced. These embodiments are described in sufficient detail to enable those skilled in the art to practice the invention. It is to be understood that the various embodiments of the invention, although different from each other, are not necessarily mutually exclusive. For example, specific shapes, structures, or characteristics described herein may be implemented as modified from one embodiment to another embodiment without departing from the spirit and the scope of the invention. Furthermore, it shall be understood that the locations or arrangements of individual elements within each embodiment may be also modified without departing from the spirit and the scope of the invention. Therefore, the following detailed description is not to be taken in a limiting sense, and the scope of the invention is to be taken as encompassing the scope of the appended claims and all equivalents thereof. In the drawings, like reference numerals refer to the same or similar elements throughout the several views.

Hereinafter, various preferred embodiments of the present invention will be described in detail with reference to the accompanying drawings to enable those skilled in the art to easily implement the invention.

Structure of Touch Input Sensing Device

FIG. 1 shows an exterior view of a touch input sensing device according to one embodiment of the present invention.

As shown in FIG. 1, the touch input sensing device 100 may comprise a touch input unit 110 that may function as a display to output visual information to a user and receive touch inputs from the user by way of touch input means such as a finger or a stylus; an input button unit 120 that may perform a predetermined function according to the type of the touch input sensing device 100 when pressed by the user; a sound output unit 130 that may output the sound or audio generated in the touch input sensing device 100; a sound sensor (not shown); and other commonly known electronic components (e.g., for mobile devices) (not shown). Although the touch input sensing device 100 herein is illustrated as a smartphone, it is not limited thereto and any type of digital equipment having memory means and a microprocessor for mathematical operations, such as desktop computers, notebook computers, workstations, PDAs, web pads, and mobile phones (not smartphones), may be adopted as the touch input sensing device 100 according to the present invention.

Meanwhile, the aforementioned touch means, which may contact the touch input unit 110 or other specific parts (i.e., the exterior parts) of the touch input sensing device 100, may be a stylus, an electronic pen, or other tools with or without electric circuits therein, which may or may not belong to the touch input sensing device 100 except when the touch means is a body part of the user such as the user's finger. The touch means may be made of various materials such as metal, wood, plastic, rubber, and glass. The touch means may be the user's fingers or hands. Because fingers are usually constituted by various parts such as tips, nails, knuckles and joints, each of the specific parts of the fingers may be the touch means according to the present invention. Likewise, the user's palm, back of the hand, or wrist may also be the touch means.

Figure 2:
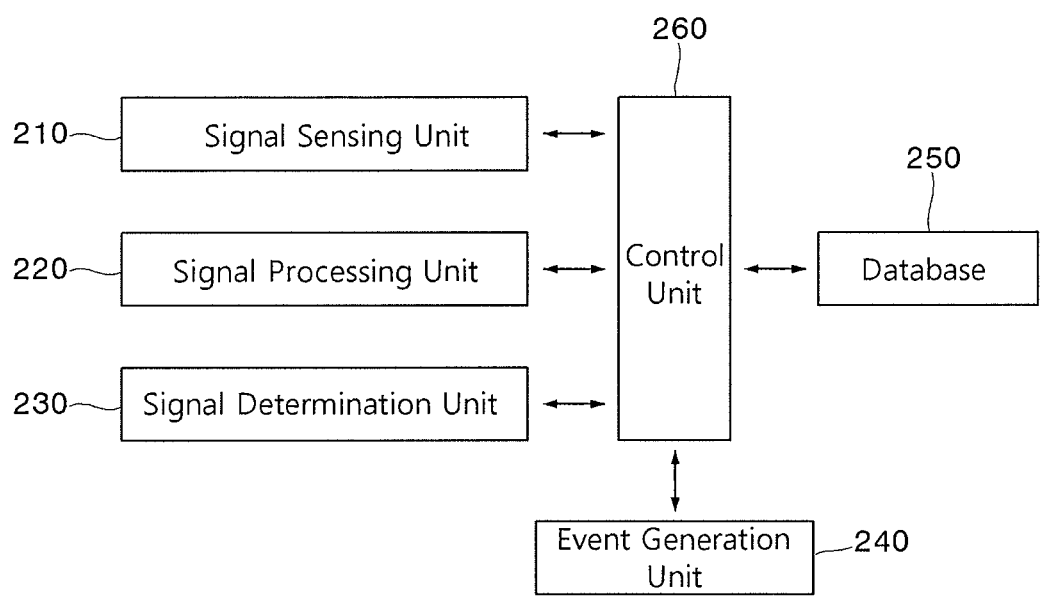
FIG. 2 shows a block diagram illustrating the internal structure of a touch input sensing device according to one embodiment of the present invention.

Hereinafter, the internal structure of the touch input sensing device 100 will be described in detail with reference to FIG. 2. FIG. 2 shows a block diagram illustrating the internal structure of the touch input sensing device according to one embodiment of the present invention.

As shown in FIG. 2, the touch input sensing device 100 according to one embodiment of the invention may comprise a signal sensing unit 210, a signal processing unit 220, a signal determination unit 230, an event generation unit 240, a database 250, and a control unit 260. According to one embodiment of the invention, at least some of the signal sensing unit 210, the signal processing unit 220, the signal determination unit 230, the event generation unit 240, the database 250, and the control unit 260 may be program modules to control or communicate with other commonly known hardware components or components for executing software, which are included in the touch input sensing device 100. The program modules may be included in the touch input sensing device 100 in the form of operating systems, application program modules or other program modules, while they may be physically stored in a variety of commonly known storage devices. Further the program modules may be stored in a remote storage device that may communicate with the touch input sensing device 100. Meanwhile, such program modules may include, but not limited to, routines subroutines, programs, objects, components, data structures and the like for performing specific tasks or executing specific abstract data types as described below in accordance with the present invention.

First, the signal sensing unit 210 according to one embodiment of the invention may perform a function to sense a signal of the sound/vibration (e.g., vibro-acoustic, structural acoustic, mechanical vibration, etc.) that is to be generated when some touch means contacts the touch input unit 110 or other specific parts (i.e., the exterior parts) of the touch input sensing device 100. To this end, the signal sensing unit 210 may incorporate or at least communicate with the aforementioned sound sensor. Examples of the sound sensor may include a common sound sensor such as a microphone, as well as a noise sensor that can sense a signal having small amplitude, a vibration sensor, and an ultrasonic sensor. Instead of a generic microphone, a hydrophone, condenser microphone, electret condenser microphone, dynamic microphone, ribbon microphone, carbon microphone, piezoelectric microphone, fiber optic microphone, laser microphone, liquid microphone, MEMS microphone or the like may also be employed. Further, an accelerometer may also be employed. The sound sensor may be disposed in at least one of the touch input unit 110, chassis, main board (not shown), printed circuit board (PCB) (not shown), enclosure and the like of the touch input sensing device 100. The signal sensing unit 210 may transmit the sensed analog sound/vibration signal to the signal processing unit 220 as described below.

Next, the signal processing unit 220 according to one embodiment of the invention may perform a function to convert the analog sound/vibration signal transmitted from the signal sensing unit 210 into a digital signal. The sound processing unit 220 may include a commonly known analog-digital converter. Thus, the signal processing unit 220 may perform at least one of sampling, quantization and encoding processes to convert the sound/vibration signal from an analog signal to a digital signal.

Further, the signal processing unit 220 may amplify the sound/vibration signal, eliminate noise from the sound/vibration signal, selectively receive the sound/vibration signal from a specific band of frequencies, or modify the waveform of the sound/vibration signal, as necessary. To this end, the signal processing unit 220 may include commonly known amplifiers, noise filters, band pass/band reject filters, Kalman filters, exponential moving average (EMA) filters, Savitzky-Golay filters, and so on. Furthermore, the signal processing unit 220 may transform the sound/vibration signal from time domain to frequency domain or vice versa.

The signal processing unit 220 may transmit the digital sound/vibration signal to the signal determination unit 230 as described below.

Next, the signal determination unit 230 according to one embodiment of the invention may perform a function to analyze the digital sound/vibration signal transmitted from the signal processing unit 220 to determine the type of the touch means that has generated the corresponding signal and the intensity (or the impact force) of the touch that has been applied by the touch means.

In general, when the touch means for applying a touch is changed, the properties of the sound/vibration signal generated by the touch also become different. For example, the tone (i.e., the shape of the wave) or tune (i.e., the frequency of the wave) of the sound/vibration generated by a touch when the touch means is a fingertip differs from that generated by a touch when the touch means is a metal stylus. Therefore, information on various properties of diverse sounds/vibration signals generated by touches from different touch means may be pre-stored in the database 250 in association with the types of the corresponding touch means and/or the parts where the corresponding touch means have touched (e.g., the touch input unit 110 or other specific parts) and utilized to implement the invention.

Examples of the property information to discriminate one sound/vibration from another include the following:

(i) Properties of sound/vibration signals in time domain: maximum amplitude, average amplitude, average frequency, mean, standard deviation, standard deviation normalized by overall amplitude, variance, skewness, kurtosis, sum, absolute sum, root mean square (RMS), crest factor, dispersion, entropy, power sum, center of mass, coefficients of variation, cross correlation, zero-crossings, seasonality, DC bias, or the above properties computed for the first, second, third or higher order of derivatives of the sound/vibration signals; and (ii) Properties of sound/vibration signals in frequency domain: spectral centroid, spectral density, spherical harmonics, total average spectral energy, band energy ratios for every octave, log spectral band ratios, linear prediction-based cepstral coefficients (LPCCs), perceptual linear prediction (PLP) cepstral coefficients, mel-frequency cepstral coefficients, frequency topology, or the above properties computed for the first, second, third or higher order of derivatives of frequency domain representations of the sound/vibration signals.

Therefore, the signal determination unit 230 may refer to the database 250 and analyze at least a part of the information on the above properties to determine the type of the touch means that has generated the digital sound/vibration signal transmitted from the signal processing unit 220. To this end, the signal determination unit 230 may also determine the part of the touch input sensing device 100 where the touch has been actually applied, as necessary. For example, the signal determination unit 230 may determine that the touch has been actually applied to the touch input unit 110 by considering together the touch signal sensed by a component other than the signal sensing unit 210 (e.g., a capacitive sensing module arranged near the surface of the touch input unit 110). Of course, the signal determination unit 230 may also determine the part other than the touch input unit 110 where the touch has been actually applied.

Meanwhile, the signal determination unit 230 may analyze the digital sound/vibration signal transmitted from the signal processing unit 220 to determine the touch intensity of the touch means that has generated the corresponding signal. For example, the intensity may represent the magnitude of the force (in newtons) that the touch means has actually applied to the touched part. In order to determine the intensity, the information on the properties of the sound/vibration signal generated by the touch as described above may also be consulted. That is, a comprehensive comparative analysis of the properties of the sound/vibration signal may be performed to determine the touch means that has caused the corresponding sound/vibration, the touched part and the touch intensity. Further, the analysis of the properties for the touch intensity may be performed by one or more algorithms that may be selected from pre-stored ones depending on the type of the touch means and/or the touched part. Examples of these algorithms may include a machine-learning regression algorithm, a heuristically determined algorithm and other algorithm determined experimentally, mathematically or based on physical principles.

One exemplary algorithm includes identifying one or more properties (e.g., log or power functions) that are most highly correlated with the touch intensity, and forming a linear combination of the properties with appropriate coefficients. This requires experimental data to be collected to establish ground truth (i.e., impact force in absolute newtons) for different touch types as explained below, across a range of users and environmental conditions. Further, the algorithm includes plotting the linear combination against the touch intensity, and deriving a regression formula that can be used for the aforementioned analysis.

Another exemplary algorithm includes using as many of the properties as possible to train a regression model with the ground truth data. The regression model may be a support vector regression model, as trained using the sequential minimal optimization (SMO) algorithm, which can also be used for the aforementioned analysis.

The touch intensity may be determined as one of n types of intensities. For example, the touch intensity may be determined as one of low, medium, and high intensities.

Meanwhile, the touch intensity may also be determined as one of consecutive numbers, e.g., from 1 to 100, as necessary.

Since the touch intensity determined by the signal determination unit 230 may change radically depending on the touch means that has applied the touch, it is necessary to determine the aforementioned scale of the intensity of the digital sound/vibration signal with respect to the individual touch means.

Figure 3:
FIG. 3 shows an exemplary graph of a sound/vibration signal when a fingertip applies a touch to a touch input unit.
Figure 4:
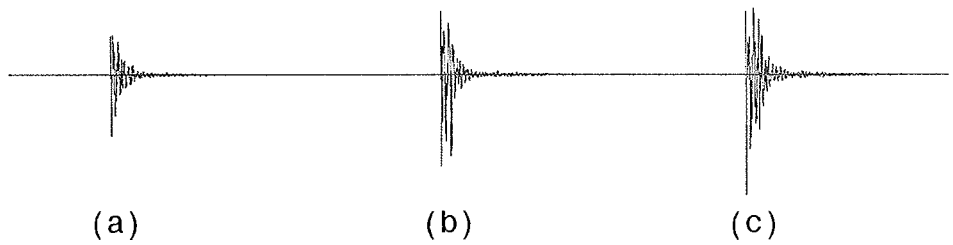
FIG. 4 shows an exemplary graph of a sound/vibration signal when touch means made of plastic applies a touch to a touch input unit.

This will be further discussed with reference to FIGS. 3 and 4. FIG. 3 shows an exemplary graph of a sound/vibration signal when a fingertip applies a touch to the touch input unit 110. FIG. 4 shows an exemplary graph of a sound/vibration signal when touch means made of plastic applies a touch to the touch input unit 110. In FIG. 3, (a), (b) and (c) represent the sound/vibration signals corresponding to the low, medium and high touch intensities, respectively. Likewise, (a), (b) and (c) in FIG. 4 represent the sound/vibration signals corresponding to the low, medium and high touch intensities, respectively. As shown by way of illustration, it is preferred that the signal determination unit 230 determine the touch intensity based on the predetermined type of the touch means, because the properties (e.g., amplitude) of the sound/vibration signal generated by the touch means may become greatly different when the touch means is changed.

The signal determination unit 230 may transmit information on the determined touch means and touch intensity to the event generation unit 240 as described below.

Next, the event generation unit 240 according to one embodiment of the invention may perform a function to generate a prearranged event based on the information transmitted from the signal determination unit 230. Different events may be generated correspondingly to the specific types of the touch means and the specific touch intensities, as set up by the user using application programs executed on the touch input sensing device 100 or fixedly set up at the touch input sensing unit 100. Therefore, in accordance with the present invention, a user may experience a variety of different events according to the types of the touch means and the corresponding touch intensities even when the user touches the same part of his/her touch input sensing device 100. Examples of such events may include selecting, magnifying, editing, removing, forwarding, playing audio, and playing video of the object corresponding to the touch, among the visual objects displayed on the touch input unit 110.

Next, the information as described above may be stored in the database 250 according to one embodiment of the invention. Although FIG. 2 shows that the database 250 is incorporated in the touch input sensing device 100, the database 250 may be configured separately from the touch input sensing device 100 as needed by those skilled in the art to implement the invention. Meanwhile, the database 250 according to present invention encompasses a computer-readable recording medium, and may refer not only to a database in a narrow sense but also to a database in a broad sense including data records based on a file system or the like. The database 250 according to the present invention may be even a collection of simple logs if one can search and retrieve data from the collection.

Lastly, the control unit 260 according to one embodiment of the invention may perform a function to control data flow among the signal sensing unit 210, the signal processing unit 220, the signal determination unit 230, the event generation unit 240 and the database 250. That is, the control unit 260 according to the present invention may control data flow among the components of the touch input sensing device 100, such that the signal sensing unit 210, the signal processing unit 220, the signal determination unit 230, the event generation unit 240 and the database 250 may carry out their particular functions, respectively.

The embodiments according to the present invention as described above may be implemented in the form of program instructions that can be executed by various computer components, and may be stored on a computer-readable recording medium. The computer-readable recording medium may include program instructions, data files, data structures and the like, separately or in combination. The program instructions stored on the computer-readable recording medium may be specially designed and configured for the present invention, or may also be known and available to those skilled in the computer software field. Examples of the computer-readable recording medium include the following: magnetic media such as hard disks, floppy disks and magnetic tapes; optical media such as compact disk-read only memory (CD-ROM) and digital versatile disks (DVDs); magneto-optical media such as floptical disks; and hardware devices such as read-only memory (ROM), random access memory (RAM) and flash memory, which are specially configured to store and execute program instructions. Examples of the program instructions include not only machine language codes created by a compiler or the like, but also high-level language codes that can be executed by a computer using an interpreter or the like. The above hardware devices may be changed to one or more software modules to perform the operations of the present invention, and vice versa.

Although the present invention has been described above in connection with specific limitations such as detailed components as well as limited embodiments and drawings, these are merely provided to aid general understanding of the invention. The present invention is not limited to the above embodiments, and those skilled in the art will appreciate that various changes and modifications are possible from the above description.

Therefore, the spirit of the present invention shall not be limited to the embodiments described above, and the entire scope of the appended claims and their equivalents will fall within the scope and spirit of the invention.

What is claimed is:

1. A computer-implemented method for processing touch inputs, the method comprising:
   obtaining a vibro-acoustic signal from sensing, by a touch input sensing device, a touch input applied to the touch input sensing device;
   determining, by the touch input sensing device, a touch type associated with the touch input by analyzing a plurality of properties of the vibro-acoustic signal, which include a time domain representation and a frequency domain representation of the vibro-acoustic signal;
   determining, by the touch input sensing device, an impact touch intensity associated with the touch type by analyzing the properties of the vibro-acoustic signal, which include the time domain representation and the frequency domain representation of the vibro-acoustic signal, wherein the determined impact touch intensity is selected from a low intensity, medium intensity, or high intensity;
   generating, by the touch input sensing device, an event based on both of the touch type and the impact touch intensity.

2. The computer-implemented method of claim 1, wherein the properties of the vibro-acoustic signal comprise sensing information generated by the touch input when the touch input is applied to the touch input sensing device.

3. The computer-implemented method of claim 2, wherein the properties of the vibro-acoustic signal comprise vibro-acoustic information, structural acoustic information and vibration information.

4. The computer-implemented method of claim 3, wherein the determining the touch type comprises determining the touch type based on analyzing the information and based on pre-stored information associated with different touch types.

5. The computer-implemented method of claim 4, wherein the pre-stored information comprises first information in a time domain and second information in a frequency domain.

6. The computer-implemented method of claim 4, wherein the determining the touch type comprises determining the touch type based on a part of the touch input sensing device where the touch input is applied.

7. The computer-implemented method of claim 4, wherein the determining the impact touch intensity comprises determining the impact touch intensity based on analyzing the properties using one or more algorithms from a group including a machine-learning regression algorithm and a heuristically determined algorithm.

8. The computer-implemented method of claim 7, wherein the determining the touch type comprises determining a first touch type associated with a first scale of impact touch intensities or determining a second touch type associated with a second scale of impact touch intensities.

9. A touch sensing device comprising:
a vibro-acoustic sensor configured to sense a touch input applied to the touch sensing device; and
a processor and memory configured to:
obtain a vibro-acoustic signal from sensing by the vibro-acoustic sensor the touch input applied to the touch sensing device;
determine a touch type associated with the touch input and an impact touch intensity associated with the touch type by analyzing a plurality of properties of the vibro-acoustic signal, which include a time domain representation and a frequency domain representation of the vibro-acoustic signal, wherein the determined impact touch intensity is selected from a low intensity, medium intensity, or high intensity; and
generate an event based on both of the touch type and the impact touch intensity.

10. The touch sensing device of claim 9, wherein the properties of the vibro-acoustic signal comprise information generated by the touch input when the touch input is applied to the touch sensing device.

11. The touch sensing device of claim 9, wherein the properties of the vibro-acoustic signal comprise one of vibro-acoustic information, structural acoustic information and vibration information.

12. The touch sensing device of claim 10, wherein the processor and memory are configured to determine the touch type by analyzing the information generated by the touch input when the touch input is applied to the touch sensing device and by using pre-stored information associated with different touch types.

13. The touch sensing device of claim 12, wherein the pre-stored information comprises first information in a time domain and second information in a frequency domain.

14. The touch sensing device of claim 12, wherein the processor and memory are configured to further determine the touch type based on a part of the touch sensing device where the touch input is applied.

15. The touch sensing device of claim 12, wherein the processor and memory are configured to determine the impact touch intensity by analyzing the information generated by the touch input when the touch input is applied to the touch sensing device.

16. The touch sensing device of claim 15, wherein the processor and memory are configured to determine the impact touch intensity using one or more algorithms from a group including a machine-learning regression algorithm and a heuristically determined algorithm.

17. The touch sensing device of claim 16, wherein the processor and memory are configured to determine a first touch type associated with a first scale of impact touch intensities, or a second touch type is associated with a second scale of impact touch intensities.

18. A non-transitory computer-readable storage medium having stored thereon data representing sequences of instructions, which when executed by an electronic device having a touch input sensing device, cause the electronic device to perform a method comprising:
obtaining a vibro-acoustic signal from sensing a touch input applied to the touch input sensing device;
determining a touch type associated with the touch input by analyzing a plurality of properties of the vibro-acoustic signal, which include a time domain representation and a frequency domain representation of the vibro-acoustic signal;
determining an impact touch intensity associated with the touch type by analyzing the properties of the vibro-acoustic signal, which include the time domain representation and the frequency domain representation of the vibro-acoustic signal, wherein the determined impact touch intensity is selected from a low intensity, medium intensity, or high intensity; and
generating an event based on both of the touch type and the impact touch intensity.

19. The computer-implemented method of claim 1, wherein the determined impact touch intensity is selected from a plurality of consecutive numbers.

20. The touch sensing device of claim 9, wherein the determined impact touch intensity is selected from a plurality of consecutive numbers.

21. The computer-implemented method of claim 1, wherein determining the impact touch intensity comprises identifying one or more of the properties of the vibro-acoustic signal that are most correlated with the impact touch intensity and forming a combination of such identified properties with coefficients based on experimental data for a plurality of impact touch intensities for a plurality of different users and environmental conditions.

22. The touch sensing device of claim 9, wherein determining the impact touch intensity comprises identifying one or more of the properties of the vibro-acoustic signal that are most correlated with the impact touch intensity and forming a combination of such identified properties with coefficients based on experimental data for a plurality of impact touch intensities for a plurality of different users and environmental conditions.

* * * * *